United States Patent [19]

Jackson et al.

[11] Patent Number: 6,147,769

[45] Date of Patent: Nov. 14, 2000

[54] DISPLAY OF SELECTED PRINTER RESPONSE FOR DISTINCT APPLICATIONS

[75] Inventors: Brion Jackson, Euless; Marvin Williams, Lewisville, both of Tex.

[73] Assignee: International Business Machines Corporation, Armonk, N.Y.

[21] Appl. No.: 09/332,509

[22] Filed: Jun. 14, 1999

Related U.S. Application Data

[62] Division of application No. 08/275,882, Jul. 15, 1994.

[51] Int. Cl.[7] ............................ B41J 15/00; B41B 15/00; H04N 1/00; H04N 1/40

[52] U.S. Cl. ........................ 358/1.18; 358/1.9; 358/1.11; 358/400; 358/448

[58] Field of Search ................................. 358/1.18, 1.17, 358/408, 442, 1.11, 400, 448; 382/41, 44, 45; 364/518–522

[56] References Cited

U.S. PATENT DOCUMENTS

| | | |
|---|---|---|
| 4,594,674 | 6/1986 | Boulia et al. . |
| 4,686,649 | 8/1987 | Rush et al. . |
| 4,896,275 | 1/1990 | Jackson . |
| 4,910,607 | 3/1990 | Kita et al. . |
| 4,947,345 | 8/1990 | Paradise et al. ........................ 358/442 |
| 5,001,697 | 3/1991 | Torres . |
| 5,133,052 | 7/1992 | Bier et al. . |
| 5,164,842 | 11/1992 | Gauronski et al. . |

OTHER PUBLICATIONS

IBM Technical Disclosure Bulletin, vol. 34, No. 2, Jul. 1991, pp. 67–68, "Displaying Command Consequences Within Distinct Applications".

Primary Examiner—Edward L. Coles
Assistant Examiner—Twyler Lamb
Attorney, Agent, or Firm—Whitham, Curtis & Whitham; Edward H. Duffield, Esq.

[57] ABSTRACT

An arrangement for emulating printer responses to combinations of applications, control commands and printers stores bit maps of characters which may be produced by a variety of printers connected to the system. Bit maps corresponding to characters within a text string, indicated by a cursor position within a text file are retrieved in accordance with a printer selection, a character code and a table address. The table address is retrieved from memory in response to a selected application profile and one or more selected commands. The printer response is produced in a window of the display as a sequential series of sub-windows corresponding to characters of the text string; each sub-window having a width corresponding to the width of each character image. The display also includes a plurality of menus for facilitating operator selection of a combination of application profiles, commands and printers to be emulated.

9 Claims, 4 Drawing Sheets

DISPLAY OF SELECTED PRINTER RESPONSE FOR DISTINCT APPLICATIONS

This application is a division of U.S. patent application Ser. No. 08/275,882 filed Jul. 15, 1994.

BACKGROUND OF THE INVENTION

1. Field of the Invention

The present invention generally relates to computer applications involving printer output, such as word-processor programs and, more particularly, to preview of printer consequences of the interaction of particular printers with particular applications.

2. Description of the Prior Art

The rise in popularity of personal computers and relatively small computers and local area network systems has led to intense competition among manufacturers of peripheral equipment, such as printers, as well as in application programs. Therefore, at the present time, it is typical to assemble computing systems, regardless of size, with peripheral equipment from among a multiplicity of manufacturers and which may embody a plurality of technologies in the achievement of their respective functions. While some standards of compatibility exist and are utilized by manufacturers to insure operational compatibility of both software and hardware products, the ultimate result of the interaction of particular hardware and software may vary in subtle but nevertheless significant ways. This is particularly true of word processing and desk-top publishing applications and printers used for realizing the finished product of those programs.

In word processing programs, it is known to provide preview features by which a simulation of the appearance of the finished page may be seen. However, these preview functions are principally directed to allowing the user to preview the page format. A page display of the text of the page is generated, often by bit-mapping of the text in a predetermined and possibly user-specified font is developed to be viewed by the user, typically at reduced size because of hardware constraints of the display. This display can also be limited in resolution due to display and bit map limitations (such as by the amount of available storage) even when different sizes of preview display are available (e.g. full page, full width, etc.). Further, such preview displays do not reflect the final appearance of the page when printed since the size of the display limits detail. Neither will such a preview image accurately reflect the response of any particular printer which might, for example, form some fonts by modification of other fonts or substitute default fonts for those specified.

The potential for differing responses of printers to identical commands and applications is well-recognized as are the differences in printer properties. Often a plurality of different printers will be connected to the same system so that the user may select the type of printer most compatible with the user's needs for a particular document. For instance, the cost-per-page of a document produced by a pin printer may be considerably less than those produced by a laser or ink jet printer. Printers with resident fonts which can produce those fonts directly from character codes usually do not require significant amounts of spooling time (the time required by the CPU or the internal processor of the printer to convert the codes corresponding to a document to printer control codes or a page image, such as a bit-mapped representation of a page) but are generally limited in the number of fonts available and are usually limited to the production of variable pitch fonts or only one or a small plurality of point sizes and pitches. Spooling time may be greatly increased by the need to download even a single special character within a large document. Printers capable of bit-mapping of pages are most flexible and accurate in the production of many fonts, point sizes and pitches and well as justification of text and variable pitch fonts. However, this capability is achieved at the expense of long spooling time while each page of the document is converted to a bit map. The print production is usually limited to laser processes with attendant relatively high expense or to pin printers of limited resolution.

However, the preview functions presently available are specific to the application programs and do not accurately reflect the response of particular peripheral devices such as printers. While such a refinement could theoretically be approached within the present technology, it is not practical to do so since the variety of printers and implementations of fonts on particular printers would require data storage and software production far beyond the size of the applications programs themselves. Within a given application such as a word processing program or desk-top publishing program, it is also possible to produce fonts or graphics through special subroutines of the applications or other applications which may then be imported into the document or even created within the document by the other application. Examples of such subroutines would be the graphics subroutines for producing equations, boxes and the like. Examples of other applications which can be resorted to for the production of fonts include GML™, Bookmaster™, Script™ and Foils™. The accuracy of preview functions is complicated by the fact that word processing and desk-top publishing applications often provide for a plurality of character attributes including differing fonts which are not readily suppressed for preview if a corresponding font or other attribute is not available on a particular printer and a default attribute would be provided by a particular printer. A common example is the production of a pseudo italics font by providing a skew between dot lines of a character row or portion thereof.

At the present time, sample windows for providing the user with a view of a font of characters and character representation in the IBM OS/2™ system editor. While this feature of the OS/2™ system utilizes font data stored in a database and therefore does not require extended spooling time to develop the image for display, the image reflects only the font as stored in the processor and does not reflect the response which will be produced by a particular printer in response to particular printer commands.

The possibility of increasing the fidelity of preview functions is further complicated by the fact that developing printer technology has permitted the feature of installable fonts which may be available from a plurality of manufacturers for each type of printer; each combination producing slightly different results. At the same time, the display hardware may limit the resolution or otherwise alter the reproduction of these fonts, diminishing the fidelity of the display to the resulting printed image, thus reducing the usefulness of the feature. In any case, the requisite bit-mapping required for a preview display of increased fidelity is comparable to the spooling required for a multi-font, bit mapping printer and thus requires an unacceptable amount of time to enable the user to preview the production of a particular font to allow choice of font during the process of text composition.

It is also known in printer technology to provide a test routine which will fully exercise the resident fonts and other capabilities of the printer, such as multiple colors, to print an exhaustive set of characters of which the machine is capable. However, while this procedure may be useful in testing a machine after repair or to assure full functionality before the production of a document, it does not allow comparison of the results of particular commands or command combinations from an application program, just as the preview function of word processors cannot display the specific response of a particular printer. The generation of all characters of all possible fonts is also far too time-consuming to use for the purpose of font production comparison during text composition.

It is also known, at the present time, to provide for the presentation of graphical images in a window of a computer display. Such images can be derived by employing a scanner, camera or a similar device to digitize a pattern of contrasting areas of a scene or document or portion thereof. However, such graphical display windows are usually associated with a document on a one-to-one basis or images are called from a database in their entirety. Even a relatively simple operation such as cropping an image or registration, superposition or conjoining portions of images is performed only with substantial operator effort.

In far earlier times, it was common for persons to display their skill in needlework by the creation of a piece of needlework which has come to be known as a "sampler", This work would typically consist of patterned needlework or embroidery including some decoration, a lower case and upper case alphabet, including numerals 0–9 and often a short maxim or saying of some significance to the artisan. This work was often made in the course of the artisan's educational process and was typically exhibited as an indication of the literacy of the artisan as well as the artisan's skill. Thus, the term "sampler" generally has come to mean an example of the work of an artisan or manufacturer which represents the gamut of at least an identifiable portion of work which the artisan can produce. The term "sampler" will thus be used in this particular sense hereinafter as an example of the product of a particular device representing an identifiable portion of the output of that device.

SUMMARY OF THE INVENTION

Within the confines of a particular system, it may be ultimately desirable for the user, for example, in the process of editing a document for "scripting", to be able to preview the production of a plurality of fonts by a plurality of printers to be able to choose the printer, as well as the fonts, to yield the best result in a completed document including a plurality of fonts. Conversely, the user may wish to produce a particular copy, such as a proof copy, in a short time or by inexpensive means where the font, resolution, etc. may each be of greater or lesser importance than in the final product. To facilitate either of these processes, it would be convenient to view an accurate reproduction of the output of a device by means of the display on which the composition is done. It would also be convenient to display an accurate emulation of at least a small portion of the actual text of the document as it would be reproduced by a printer in order to accurately portray printer consequences. For example, in dependence on whether a font is of fixed pitch or variable pitch, a tab command (which, in fixed pitch fonts is typically taken as equal to five spaces) may be larger or smaller in a variable pitch font. Similarly, the spacing between certain combinations of characters (e.g. "A" and "V", "L" and "T", "F" or "t" and "i", etc.) may be modified in certain fonts to reduce spacing, join serifs or otherwise improve the aesthetic appearance of the text as it is to reproduced.

It is therefore an object of the present invention to provide a display screen format in the nature of a "sampler" to immediately provide the user with an accurate indication of the result of the combination of an application program, particular commands therein and a particular peripheral device such as a printer.

It is another object of the invention to provide a display of a sample of the output of a selected peripheral device in combination with the commands associated with the production of that particular sample in accordance with a particular application program.

It is a further object of the invention to provide for the display of a succession of samples of the output of a peripheral device in combination with menu selection of applications and commands and peripheral devices associated with the production of that result.

In order to accomplish the above and other objects of the invention, a memory architecture is provided for accessing a sequence of images stored in the form of bit maps including means for storing a plurality of table addresses in the form of a first set of tables, means for storing the bit maps in the form of a second set of tables, means for selecting a table from the second set of tables, and means for accessing at least one bit map within the table selected from the second set of tables responsive to a combination of parameters including one of the plurality of table addresses.

In accordance with another aspect of the invention, a system is provided for previewing a portion of a document to be produced by a printer under control of a data processing means including means for displaying a plurality of menus, at least one menu displaying the identities of at least two printers connected to be controlled by the data processing means and at least another menu displaying at least some control commands which may be inserted in the document for controlling a selected printer, means for selecting at least one of a printer and a control command from one of the menus, means for storing images of each of a plurality of characters which may exist in the text string for each of at least two commands displayed in the menu displaying control commands as the plurality of characters would be produced by at least one of the printers and means responsive to the means for selecting at least one of a printer and a control command for retrieving and displaying images corresponding to a sequence of characters in the text string corresponding to at least a selected command and a selected printer.

In accordance with a further aspect of the invention, a method of assembling an image for display from bit maps of image data including the steps of obtaining a table address in response to a query portion containing first and second query parameters, addressing at least one bit map in response to the table address and a third query parameter, and displaying the bit map.

In accordance with yet another aspect of the invention, a method of previewing a text string including the steps of assembling a query including at least first and second query parameters associated with each character of the text string, retrieving a bit map from memory for each character of the bit string in accordance with said at least first and second query parameters and displaying each bit map as a sub-window within a window of a display.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
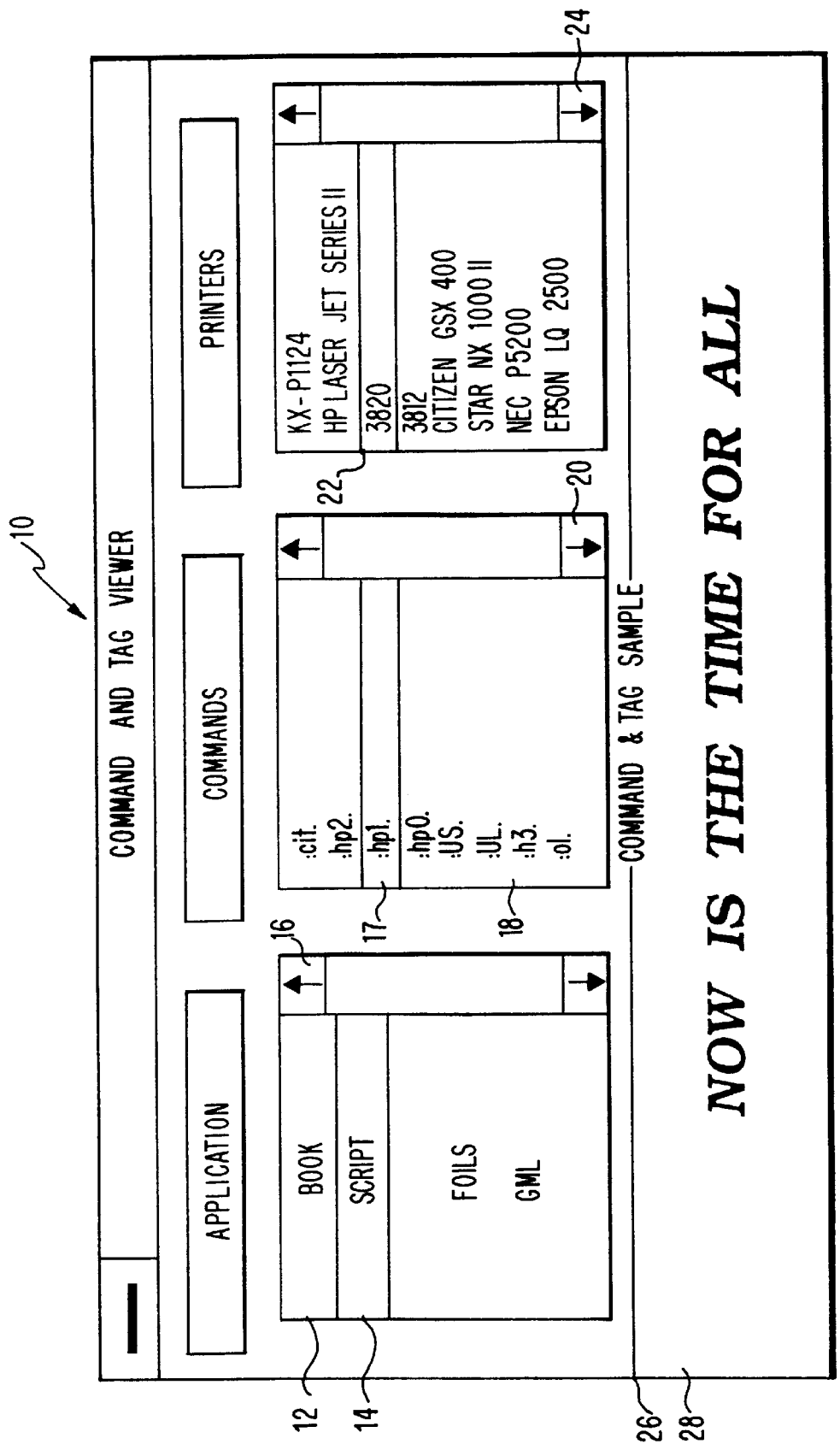
FIG. 1 is an exemplary screen produced by the invention.

Referring now to the drawings, and more particularly to FIG. 1, there is shown a preferred form of a display screen for communicating to an operator the current application, commands and printers, both available and selected, and the results of a particular combination of the application, command and printer currently selected. The upper portion of the display preferably includes a plurality of menus. The number of menus is preferably chosen as three since these can be conveniently presented side-by-side on a single screen. However, it is to be understood that other parameters and values impacting display appearance can be included in the same fashion as those shown in a manner which will be discussed in detail below.

To the left, in the upper portion of the display screen 10 is a list of applications 12 available for the production of the document or portions thereof. These could include one or more word processing programs having one or more resident fonts therein. However, for purposes of this invention, it is only necessary that these applications include some resident font or other printer control function which would affect the appearance of printer output. Applications which control the generation and reproduction of fonts may be provided in the same list, as shown, or in an additional list. However, for convenience of viewing by an operator, scrolling on a single, extended, list is provided by means of a scrolling bar 16. Thus, display of combinations of applications can be presented. Conversely, one or more available word processors could be listed in a heading line for the screen. This menu, as illustrated in FIG. 1 includes some of the applications listed above. The application currently selected is shown highlighted by a line cursor image 14. If a header line is used for a further menu list, highlighting by cursor image could also be provided.

It should be understood that the invention operates as an emulator of the application. Therefore, it is not necessary to actually transfer text files between applications. As will be explained in greater detail below, a text file, whether generic (e.g. ASCII) or of a form associated with a particular application has a text string identified therein in dependence on cursor position within the text file. Any control codes existing in the file, including selections made from the three windows of FIG. 1 will provide data which will be used to retrieve facsimile data from memory. Therefore, the invention operates independently of the application, per se, or the control codes or printer selection which may be currently present in the text file. Therefore, in the interest of achieving the most rapid response of the invention, the actual entry of control codes and printer selection codes into the text file and transfer of one or more text files between applications is preferably deferred until termination of an operation of the invention, such as when the screen of FIG. 1 is exited. Such entry of codes and selections and transfer of files, if necessary, is preferably carried out by subroutines embedded within the exit process in a manner well-understood in the art and not unlike the removal of automatic back-up files during word processor exit procedures.

In the center of the upper portion of the display screen, a command menu 18 is illustrated. The command menu is likely to be longer than can be displayed at a single time and a scrolling bar is preferably provided for the menu, as well. As with the command menu, the current selection is indicated by cursor highlighting. Commands included in this list and which are useful in explanation of the invention may be:

:cit.—italic font,

:hp1.—creates a boldface heading,

:hp2.—highlight in bold font,

:ul.—underline,

:tb5.—tab five spaces,

:ol.—ordered list, and

:ul.—unordered list.

A third, similar, printer menu 22 is provided at the right side of the screen to indicate the printers available on the system and the current selection. Again, a scrolling bar is preferably provided to increase the number of printers which may be accommodated.

It is to be understood that selection of applications, commands and printers can be made or altered directly from this screen by appropriate cursor manipulation, preferably through the use of a mouse or light pen in a manner well-understood per se in the art. Upon each such alteration of the combination of profile, command and printer, the operation of the invention will be repeated to redisplay the effect which will result from the altered combination.

At the bottom of the screen, a window 28 is provided for displaying the effect of a particular combination of the profile, command and printer shown by the-menus and cursors to have been selected by the use of an application by the operator. The window is identified by a header 26 containing an appropriate legend such as "Printer Font & Command Sampler".

Figure 2:
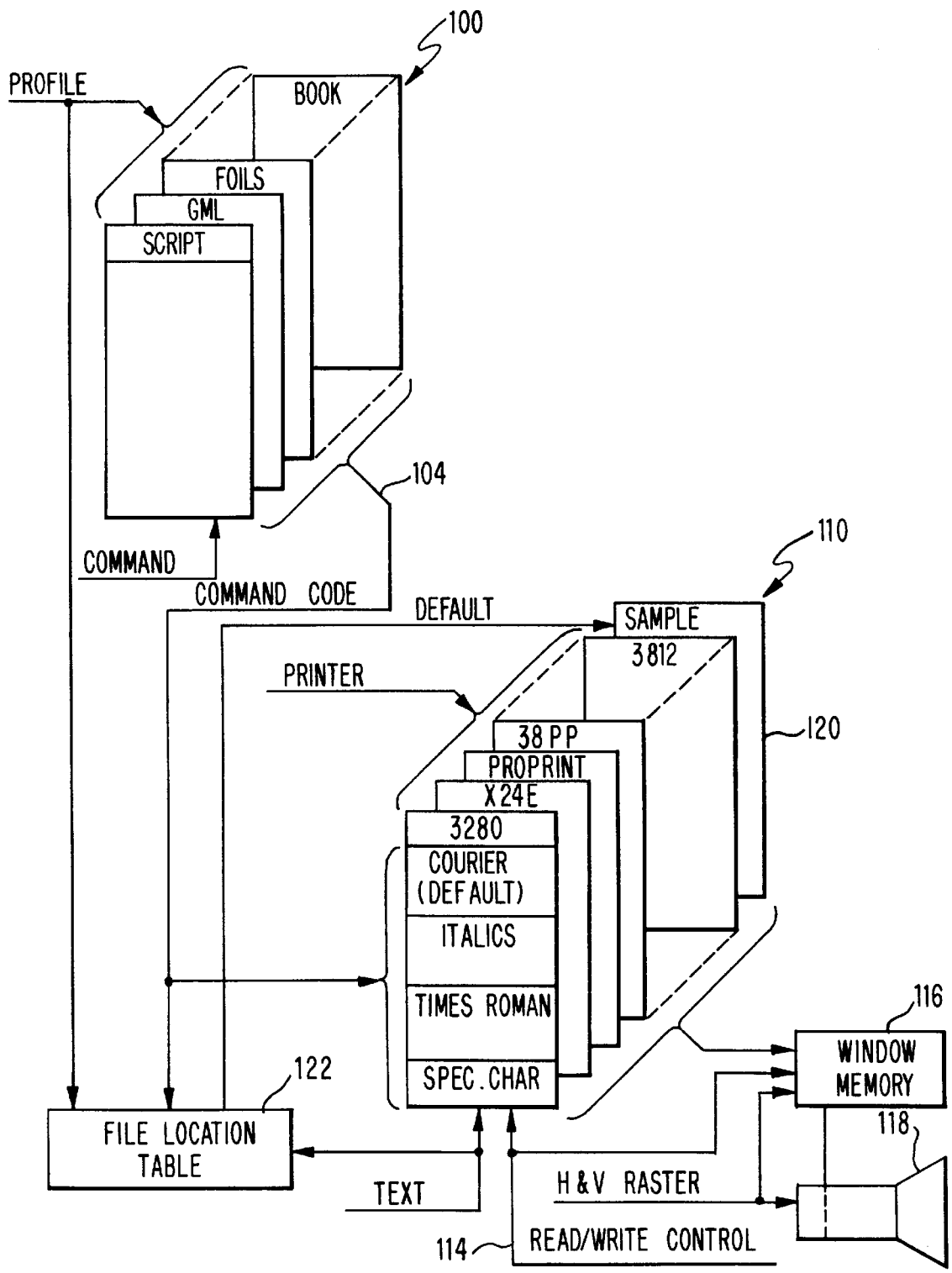
FIG. 2 is a schematic diagram showing the architecture of the system and image database in accordance with the invention.

Referring now to FIG. 2, a preferred architecture of the invention is schematically shown. Central to this architecture is a memory arrangement preferably including a relational database having at least two sets of tables 100, 110. These tables may be stored in any type of memory structure such as compact disk read-only memory (CD-ROM), disk, or in any other memory structure of the system, such as a cache. It should be understood that the term "table" does not necessarily infer any particular memory structure but only that certain types of data may be selected as a group (e.g. a "table") and further selection can be made within that group. However, it is considered advantageous to provide tables as separate planes of memory. Profile tables 100 include a table for each application which can be run on the system, such as Script™, GML™, etc., referred to above.

Each of the profile tables contains a list of printer commands which are available in that application and a corresponding list of command codes corresponding to a command and an application profile. Input of the application and command selections causes the profile tables to output a single command code as indicated at 104. This command code or token is used to address a location in one of the image tables 110, as will be described below.

Image tables 110 contain a table for each type of printer (e.g. 3280, X24E, etc.) connected to the system. Each table contains bit maps in matrix form of every character which can be produced by that printer. These bit maps are derived by scanning the actual printer output of a representative printer of that particular type. The images should be scanned and digitized at a resolution similar to the pixel density provided by the printer having highest dot density which is connected to the system. The scanning resolution should preferably be kept constant for all image tables. The bit maps will preferably also contain character width data, particularly for fonts having variable width characters, such as the "Times Roman" font. A separate bit map is derived for each character in each font and all special characters which can be produced by the printer and entered into the image table corresponding to that printer.

In use, the cursor location within a document will define the beginning of a string of bytes, hereinafter referred to as a text string, of a predetermined length defining the characters of text at the point of interest and which will be presented to the user by the invention. These bytes of the text file may also include some commands. It should be noted that at least one command will be effective at any given point in the text (e.g. for font selection) and all effective commands can be found by searching backward through the document from the cursor location.

Since the function of the invention is to provide a printer response emulation corresponding to application and printer selections as well as commands, it is to be expected that the user will wish to insert one or more commands into the text file; each being inserted at the current cursor location. If a command is found at the cursor location, it will be used to control command menu cursor 17 to highlight the corresponding command name displayed in the menu. If no command is found at the cursor location, highlighting will be done only in response to selection of a command from the menu. Plural commands may be entered in sequence, each entry causing movement of the cursor in a conventional manner through the text; each such entered command will then immediately precede the cursor position which defines the beginning of the text string. Therefore, only a single command which corresponds to the cursor location will be indicated by command menu cursor 17. The operator can discover all effective commands by motion of the cursor defining the beginning of the text string. Alternatively, an additional window could be provided similar to a "reveal codes" window common in word processor applications. However, for purposes of comparing the effects of commands and alternative commands such as ordered and unordered lists, in particular, which could be entered at a text location, this has not been found necessary or particularly helpful to a user. Many commands such as italics which may be present at earlier locations in the text file and effective at the cursor location will be evident from the emulated display at window 28 and only the change of the appearance of the text in response to changes of application, command and printer selection will be of importance to the user.

Any command codes located within the text string are extracted from the text string, if necessary, and the remaining bytes of text are used, together with command tags from one of the profile tables 100 to address a plurality of respective bit maps of single characters in image tables 110. In the parsing of the text string and the assembly of the query request, which will be described in greater detail below, all effective control codes are found for each character of the text string and used to access each of a plurality of character images corresponding to the characters of the text string.

Each character code of the text string is sequentially applied to one of the image tables to access a sequence of bit maps corresponding to the sequence of character codes in the text string. The bit maps in this sequence are then scanned to provide a read out of image bits corresponding to the printer response which would be generated by the combination of application, command code, printer selected according to the text indicated by the cursor. This readout is preferably done serially or as a serial sequence of strokes or slices through the character under control of a read/write control signal 114, supplied to both the image tables and the window memory 116, if used. The read/write control signal may or may not be the same as the horizontal and vertical raster signals used to control the display device, such as CRT 118. It is deemed preferable to read out the individual bit maps in accordance with vertical slices through the character. If this is done, both constant pitch fonts and variable pitch fonts may be reproduced with proper occlusion by adjusting the width of the bit maps to character widths. In this case, the width of each bit map provides the character width data referred to above and both fixed and variable pitch fonts may be handled in the same manner. No special arrangements need be made to position characters on the basis of character width. An end-of-character signal is merely generated when the bit map scanning is complete to call the bit map corresponding to the next character in the string. It may be helpful to visualize this operation as the formation of a plurality of sub-windows within window 28; each sub-window corresponding in width to the width of each single character bit map in image memory 110.

As illustrated, the group of bit maps output in response to application, command and printer selections and each of the characters of the text string are stored in a window memory which can be provided in random access memory or in any other memory structure of the system capable of sufficiently high speed operation to accommodate the dot rate requirements of the display and to provide resolution comparable to the printers to be emulated, such as a cache. This window memory is not necessary to the practice of the invention if the system is capable of reading the image tables in real time. However, inclusion of a window memory is preferred at least since it allows scan direction conversion, allowing the bit maps to be read in vertical columns or slices and reproduced for display in accordance with horizontal scan lines of a display raster.

It should also be noted that the screen of FIG. 1 is also useful for selection of commands and printers quite independently of the usefulness for providing an accurate preview of printer results. As will be discussed in more detail below, a bit map may not be available for the character selected, the selected font may not be available on a particular printer or some other mismatch between the selected input combination and image memory may arise. It may also be important to communicate the nature of this mismatch to the user.

For this purpose, image memory 110 also contains table 120 containing samples of default fonts and error messages. When the screen of FIG. 1 is called and the operation of the invention begun (and, thereafter, each time the selected combination is changed, the file allocation table 122 corresponding to both profile memory 100 and image memory 110 is checked to assure that a complete return can be made of all requested bit maps. If not, image table 120 is accessed by the remainder of the information and will return a predetermined sample of default data or an error message. For instance, if a selected profile table does not exist, no command tag will be produced and insufficient data will be available to return any selected image and an error message should be returned since this would represent selection of an application which could not be used by the system. If, in contrast, a special character was not available on a printer or within a font, a return of a sample of the font, but not necessarily the text in the text string allows the operator to select an alternate symbol from the font. Similarly, if the selected font is not available and a default font will be substituted by the printer, that fact is communicated by the display of a predetermined sample image rather than text corresponding to the text string. The user can evaluate the appearance of the default font from the sample and can easily accept the default font or make a selection of another font by sequential selections from the menus of the screen of FIG. 1 until the text string is displayed. The appearance of the text in the default font can be evaluated by the user simply by selecting the default font, such as by selecting the Courier font if the 3280 printer had been selected. In this way, the user may also effectively browse through the capabilities and responses of different printers without having any particular knowledge of their capabilities.

In summary, the memory architecture of FIG. 2 allows the efficient organization of many facsimile-type images so that ones or a combination of those images may be readily retrieved based on a selected combination of application, command and printer as well as allowing efficient interaction of a user with a data processor to make such a selection. The invention and memory architecture, largely by virtue of profile tables 100, allows the screen of FIG. 1 to be produced as a so-called pop-up function which is entirely independent of any feature or function of any application with which it may be used. By the same token, the invention imposes no constraint upon any application with which it may be used or any command available therein. The above-disclosed memory architecture is sufficient for the practice of the invention by those skilled in the art since the production of screens with windows and menus is well-understood in the art and is disclosed, for example, in *Displaying Command Consequences Within Distinct Applications*, IBM Technical Disclosure Bulletin Volume 34, No. 2, July 1991, PP. 67–68, which is hereby incorporated by reference.

Figure 3:
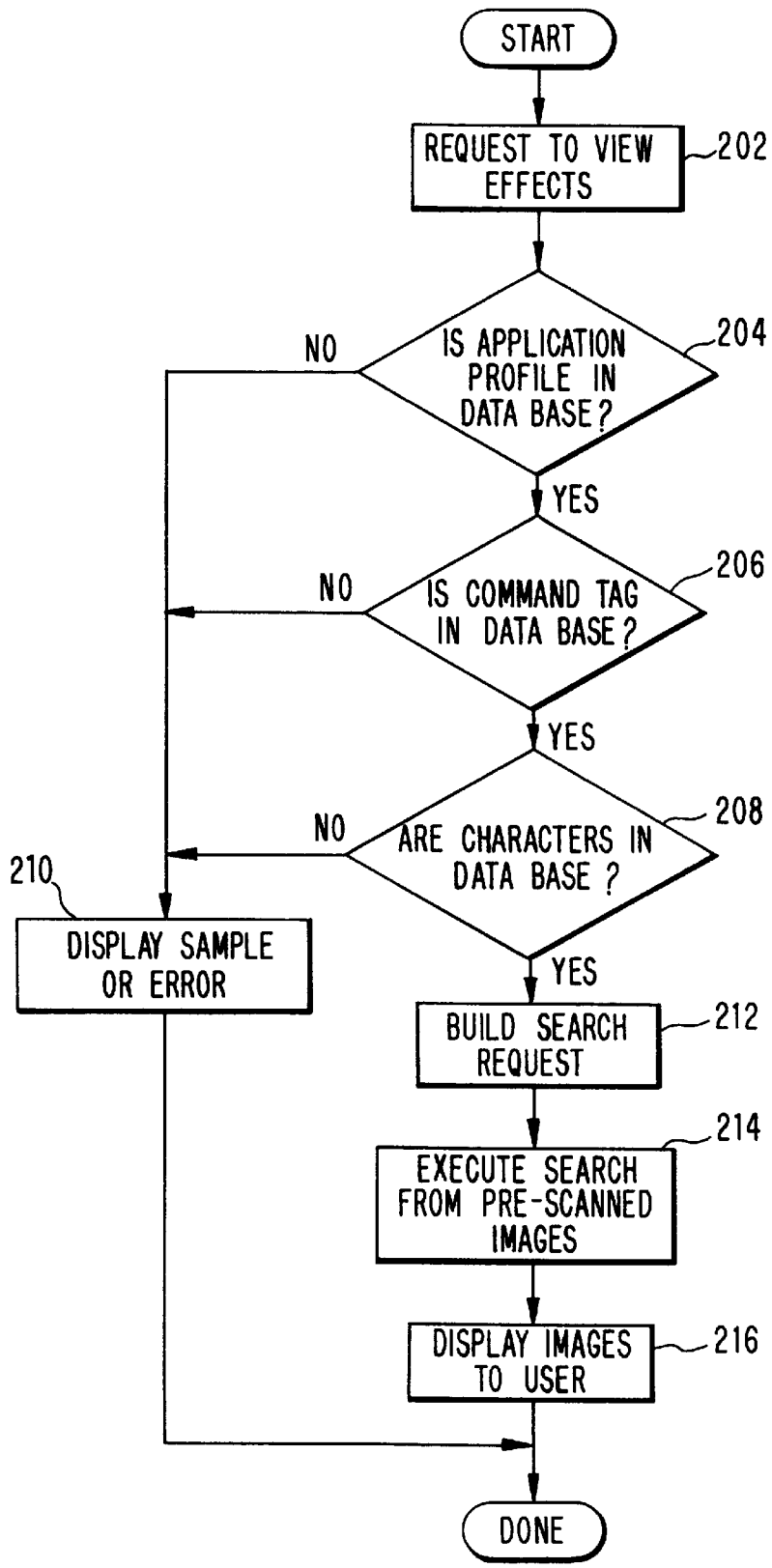
FIG. 3 is a flow chart indicating the operation of the invention.

The operation of the invention will now be described with reference to FIGS. 3 and 4. In operation, when the screen of FIG. 1 is called by a request to view printer effects 202, the selected combination of application, command and printer are determined as the parameters of a search request for the profile and image memories 100, 110. A series of tests are then performed on the memories to determine if corresponding data is present in the database. Specifically, the file allocation table 122 is checked 204 to determine if a profile is present in the database for the selected application. If so, the file allocation table 122 is checked 206 to determine if a command tag is in the database corresponding to the selected command. If so, than a final check of the file allocation table 122 is done 208 to determine if the characters specified in the text string are present in image memory 110. It should be noted that the character images may depend, in part, on the command tag. If any of tests 204, 206, 208 fails, branching occurs to display a sample or an error message through the use of table 120, as described above.

If command tag and image data are available, a search request is built from the data indicating the selected application, the command tag, the selected printer and the text string. It should be understood that the search request according to the invention is a composite search request, including a search request for each character of the character string, each in combination with the other three parameters of the search request (e.g. application, command and printer). When this composite search request is assembled, the search is executed 214 for each character code in the text string, one after the other, and the bit maps or portions of each are read out in sequence to develop a composite bit map for the entire text string. As indicated above, the bit map readout may be done in real time concurrently with the driving of the display, or, preferably, the composite bit map may be loaded into a window memory 116 and then displayed 216 to a user.

Figure 4:
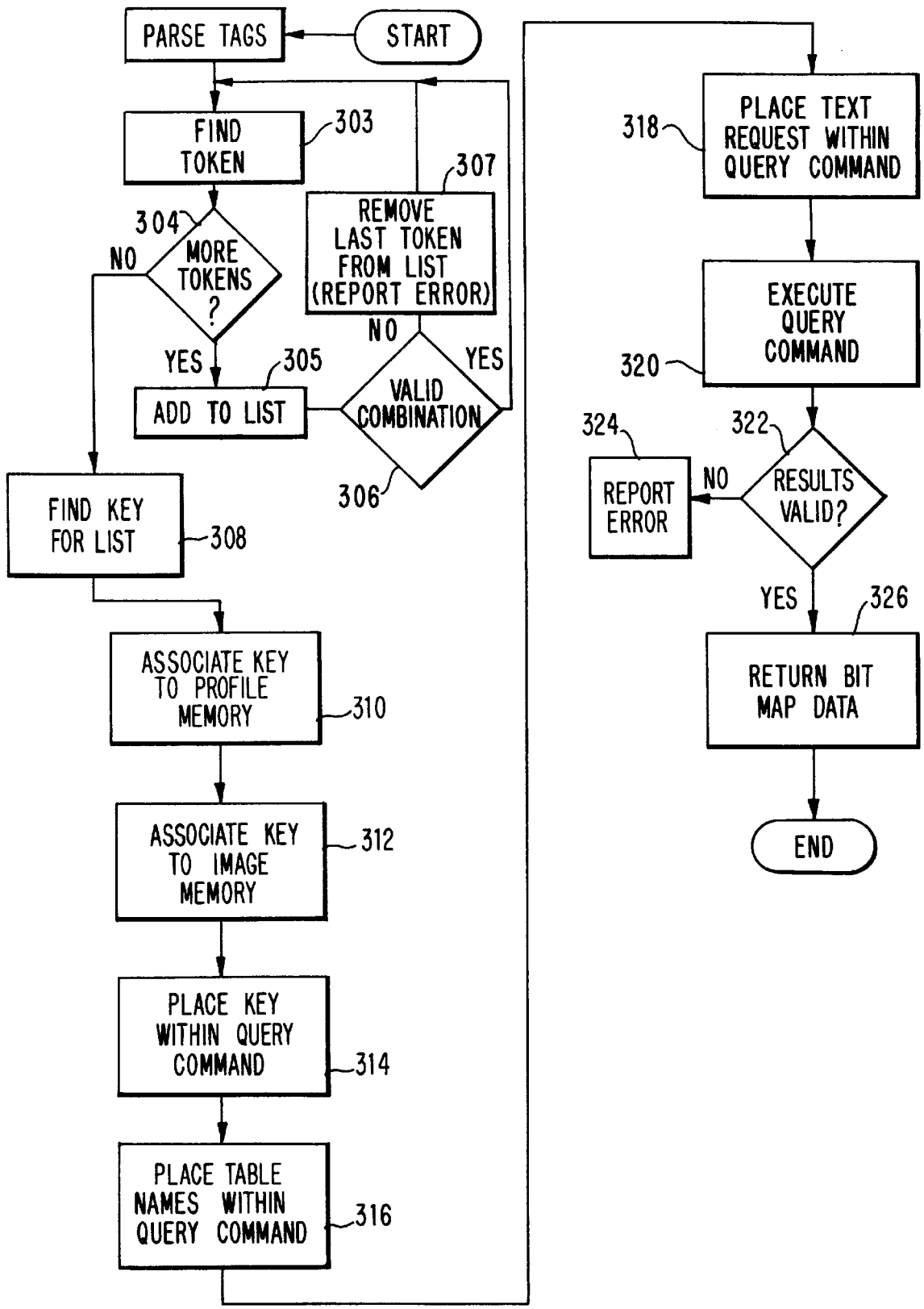
FIG. 4 is a flow chart illustrating the detailed operation of the "build search request" step of FIG. 3.

The building of the search request is shown in greater detail in FIG. 4. To begin building the search request, the tags are parsed 302 to detect all command tags (e.g. codes corresponding to commands in the text file) previous to the cursor position which are effective at the beginning of the text string, any command entered from menu 18 and any commands within the text string. Then, the tokens (e.g. the recognizable elements of the search request) are found 303 in sequence in accordance with the command tags. As each token is found, a test is made 304 to determine if more tokens must be found to correspond to the effective command tags at and within the text string. If there are new tokens, the last token found is added to a list of tokens at 305 and the list is tested for validity at 306.

There can be several reasons for a list being rendered invalid by the addition of a token. The most common would be a command which would not affect the appearance of the printed text such as a page size command. If the list is rendered invalid by the addition of such a command, the command is removed from the list and the search is continued through the text or command tags until the last token is found.

When the last token has been found, the process branches at 304 and a key corresponding to the combination of tokens in the list is found. It should be noted that if command tags are found within the text string when the text is parsed at 302, an additional list and corresponding key will be developed for each command within the text string. This key, representing one or more effective commands, is used as the command input to table 100 in FIG. 2. Similarly, application profile and printer tokens are found and placed within the list during the parsing operation. It will be understood that application and printer tokens may or may not be included in combinations of tokens used to select keys, as may be convenient in view of the relative numbers of applications, commands and printers which are to be emulated.

Each token or key is then associated 310, 312 with one of the profile memory 100 and the image memory 110 insofar as each reflects tokens by which each of the memories 100, 110 may be addressed. It is to be understood that keys may represent one or more tokens but otherwise do not differ therefrom. While the use of keys allows a single name or identification to access a particular table or table portion, use of tokens alone or in combination with keys may be advantageous in some instances, such as production of modified fonts from other fonts (e.g. for overstrike or addition of diacritical marks), if the printer produces modified fonts in the same manner. This would allow some reduction in the amount of memory required for the character bit maps.

Next, the query command is assembled by insertion of keys or tokens, table names and text codes (e.g. table addresses corresponding to addresses within a table) in the query command in a sequence of steps 314, 316 and 318. The query command is then executed 320 to search the database and return the contents of bit maps which are checked 322 for validity and an error reported 324 if any invalid data is detected. If no invalid data is detected the data is output for control of the display in the window of FIG. 1.

In summary, it will be evident to those skilled in the art that the above memory architecture when operated and accessed in the manner disclosed above will provide a display in the nature of a "sampler" to allow a user to evaluate and sequentially compare the results of a combination of application, command and printer upon a text string of characters or symbols at a particular location within a document.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A memory architecture for accessing a sequence of images stored in the form of bit maps of a combined response of at least an application and a peripheral device including means for storing a plurality of tables addresses in the form of a first set of tables, means for storing said bit maps in the form of a second set of tables, means for selecting a table from said second set of tables, and means for accessing at least one bit map containing a facsimile response of a combination of an application and a peripheral device within said table selected from said second set of tables responsive to a combination of parameters including one of said plurality of table addresses.

2. A memory architecture as recited in claim 1, further including means for storing sample images and default messages as bit maps in said second set of tables, means for determining if a bit map stored in said second set of tables corresponds to a selected combination of parameters, and means for selecting at least one of said sample images in response to said means for determining if a bit map stored in said second set of tables corresponds to a selected combination of parameters when a bit map corresponding to said selected combination of parameters is not found.

3. A memory architecture as recited in claim 1 wherein said table addresses correspond to selected combinations of application profiles and commands and said query parameters include printer identifications and character codes corresponding to a text string.

4. A system for previewing a portion of a document to be produced by a printer under control of a data processing means, said document including a text string, said system including means for displaying a plurality of menus, at least one of said menus displaying the identities of at least two printers connected to be controlled by said data processing means and at least another of said menus displaying at least some control commands which may be inserted in said document for controlling a selected printer, means for selecting at least one of a printer and a control command from one of said plurality of menus, means for storing images of each of a plurality of characters which may exist in said text string for each of at least two commands displayed in said menu displaying said control commands as said plurality of characters would be produced by at least one of said at least two printers and means responsive to said means-for selecting at least one of a printer and a control command for retrieving and displaying images corresponding to a sequence of characters in said text string corresponding to at least a selected command and a selected printer.

5. A system for previewing a portion of a document as recited in claim 4 wherein said means for storing images further includes means for storing a plurality of sample images and default messages and said means for retrieving images includes means for determining if images corresponding to a selected printer and a selected control command are present in said means for storing images for each character in said text string, said means for retrieving a sequence of characters further including means for selecting and displaying at least one image from said sample images and default messages.

6. A system for previewing a portion of a document as recited in claim 5 wherein said means for determining if images corresponding to a selected printer and a selected control command are present in said means for storing images includes a file allocation table.

7. A system for previewing a portion of a document as recited in claim 4, wherein said means for displaying a plurality of menus includes means for simultaneously displaying at least one window with said menus and said means for retrieving and displaying images includes means for displaying a sequence of said images in said window.

8. A system for previewing a portion of a document as recited in claim 7, wherein said means for storing images includes means for storing a plurality of bit maps of said images, each said bit map having a predetermined width, and said means for retrieving and displaying said images includes means for displaying said bit maps corresponding to a sequence of characters in said text string immediately adjacent one another in said window.

9. A system for previewing a portion of a document as recited in claim 4 wherein said means for storing images includes a means for storing table addresses correspond to selected combinations of application profiles and commands and said images are accessed in response to query parameters which include printer identifications and character codes corresponding to a text string.

* * * * *